UNITED STATES PATENT OFFICE.

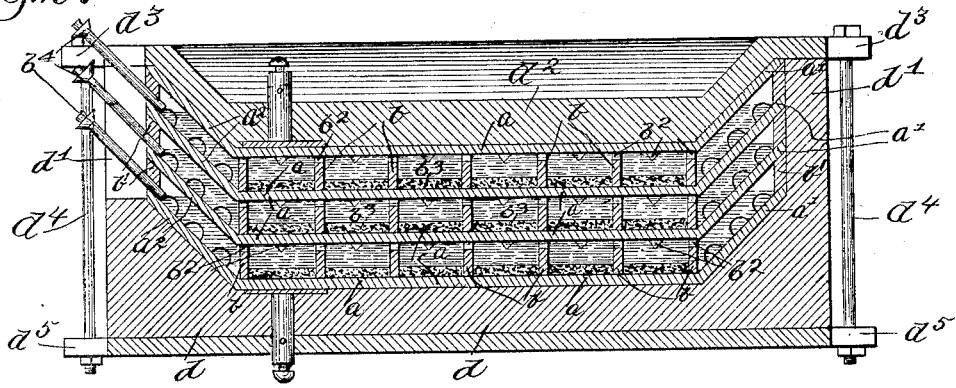

WILLIAM J. BUCKLEY, OF CHICAGO, ILLINOIS.

STORAGE BATTERY.

SPECIFICATION forming part of Letters Patent No. 675,588, dated June 4, 1901.

Application filed October 9, 1899. Renewed April 29, 1901. Serial No. 58,007. (No model.)

*To all whom it may concern:*

Be it known that I, WILLIAM J. BUCKLEY, a citizen of the United States, residing at Chicago, county of Cook, and State of Illinois, have invented certain new and useful Improvements in Storage Batteries; and I do hereby declare the following to be a full, clear, and exact description of the invention, such as will enable persons skilled in the art to which it appertains to make and use the same.

My invention relates to improvements in storage batteries, and especially to a class of storage batteries wherein the plates composing the elements of the said battery are made to serve as a part of the cell or case for containing the electrolyte and in which both sides of the plates are active, but oppositely polarized.

One object of my invention is to provide a battery wherein the greatest possible portion of the surface composing the respective elements of the cells is exposed to the action of the electrolyte; furthermore, to provide a battery wherein the connections between the various cells is inherent in the plate, so that delicate corrosive connections are not required, and, furthermore, to provide a separator between the respective elements of the cell so constructed that it will prevent "washing" of the surfaces of the elements, which action would produce rapid disintegration.

A further object is to provide a means whereby each cell forming a part of a battery and containing an electrolyte may have a surplus quantity of the electrolyte not acting upon the plates reserved to supply the deficiency caused by evaporation or decomposition.

With these and other objects in view that may hereinafter appear and be more specifically pointed out in the appended claims my invention consists in the novel constructions and combinations herein shown and described.

Figure 1 is a plan view of my battery with the top element removed, showing the separator. Fig. 2 is a section taken through line 2 2 of Fig. 1. Fig. 3 is a modification of Fig. 2.

In the several views the same letters of reference denote similar parts.

A sheet of metal $a$, preferably of lead or an alloy thereof, is bent into a pan shape, with flanging sides $a'$ $a^2$. These sides extend all around the plate $a$.

A support and separator $b$, made of an insulating material, is formed into parallel bars and cross-bars, as shown in Fig. 1. $b'$ represents four continuous pieces that form a water-tight joint between the two lead plates that the particular grid of which they are a part separates. Each lead plate composing the battery is superposed upon one of these grid-separators. It will be noticed that the grid is divided into a number of compartments by the bars $b$. These bars extend from the top surface of one of the pans or plates to the bottom surface of the one that rests upon them. Small notches $b^2$ are cut into the top surface of the bars $b$, and by this means a restricted passage-way for the electrolyte is provided between the various compartments.

I prefer to make the interior of the pan the negative element, and to increase the surface I propose to fill the compartments between the bars composing the grids with a mixture of an absorbent granular electric conductor $b^3$, such as coke, and an active material, such as oxid of lead. I have found from experience that a mixture of this character greatly increases the available surface of the active material to the action of the electrolyte.

The lower surface of the pan forms, preferably, the positive element of the cell adjoining the one of which the upper or interior surface is the negative element, the connection between the respective cells being inherent in the lead plate or pan, of which each side is made active and of opposite polarity.

In Fig. 3, which shows a modification of my structure, the pan $a$ may have its bottom surface formed into dovetailed recesses $c$, adapted to contain active material $c'$, and a screen of lead cloth $c^2$ may be placed on top of the separator $b$ before the lead pan $a$ is placed thereon. The lead cloth will prevent the active material from falling out of the recesses $c'$.

A tube $b^4$ is made a part of the separator $b'$, and by this means the necessary liquid may be poured into the space existing in virtue of the separator between the succeeding pans, and by this means the gases evolved may escape, and the tube answers a further purpose— that of being a handy indicator for determining the quantity of liquid within each cell. When the tube $b^4$ is full, there is always a surplus quantity of liquid therein contained not acted upon by the electrolytes to supply the deficiency caused by decomposition, evaporation, &c.

The manner of supporting the battery when it is composed of a number of cells nested one within the other, as shown, is an inseparable part of the invention. The entire weight of the battery is borne by the bottom cells. It is necessary, therefore, that they should be properly supported in order to carry the great weight. For this purpose I form the base of my structure so that one of the pans will fit it neatly, or one of the grids $b$ may be in a similar manner placed on the structure for more perfectly insulating the metallic portion of my battery, and then the battery may be built upon this. I prefer to use a good quality of filled lumber of which to construct the support. Vertical supports $d'$ rise from the base $d$ and are intended to hold the edges of the pan $a$ in position and prevent the battery as a whole from shifting. A piece $d^2$ fits into the upper pan and projects beyond the edges, or clips $d^3$ may be attached thereto, and bolts $d^4$ may be passed through the said clips, and similar clips $d^5$ on the base may be made to secure all of the elements and separators in intimate relation, so that the space between the plates will be fluid-tight, and all of the parts composing my battery will be maintained in a fixed position, that will prevent chafing and derangement, which so frequently result in the use of individualized cells.

My battery could be constructed with plain flat lead plates, with the separators adapted to form water-tight joints between the plates which they separate in the manner shown, and the plates could be made so that they would occupy a vertical position when the cell is completed, without departing from the gist of my invention.

My object in providing a restricted passage-way $b^2$ between the compartments formed by bars $b$ is to allow the electrolyte to flow into each compartment from the tube $b^4$ and yet prevent destructive washing of the plate by any violent agitation of the electrolyte, as when a vehicle carrying the battery is suddenly moved or stopped. The passage-ways allow the liquid to move slowly from compartment to compartment and prevent the movement of the electrolyte as a whole.

Having described my invention, what I claim as new, and desire to secure by Letters Patent of the United States, is—

1. A storage-battery cell comprising two plates, elements of the said cell, a separator between the said elements, compartments in said separator and small passage-ways in the walls of said compartments, substantially as set forth.

2. A storage-battery cell comprising two plates, a separator extending between said plates, compartments in said separator, passage-ways in the walls of said separator, and a tube communicating with said compartments and extending above the said cell, substantially as set forth.

3. A storage battery comprising a series of cells, plates and plate-separators alternating in position, fluid-compartments in said separator, restricted passage-ways in the walls of said compartments, and a means such as bolts for holding the elements of said battery in a fixed relation, substantially as set forth.

4. A storage battery comprising a series of cells, each cell consisting of a pan-shaped element, a separator between said elements, a concave battery-support into which the lower element is adapted to fit, a convex support adapted to fit into the uppermost pan-shaped element, and bolts between the said supports for holding said elements together, substantially as set forth.

5. A storage-battery cell comprising two plates, elements of the said cell, a separator between the said elements, compartments in said separator, and a granular conducting, absorbing material, such as carbon, and active material within said compartments, substantially as set forth.

In testimony whereof I have signed this specification, in the presence of two subscribing witnesses, this 3d day of October, 1899.

WILLIAM J. BUCKLEY.

Witnesses:
FORÉE BAIN,
M. F. ALLEN.